US012684074B2

(12) United States Patent
      Sawada

(10) Patent No.:     US 12,684,074 B2
(45) Date of Patent:        Jul. 14, 2026

(54) IMAGE FORMING APPARATUS, CONTROL METHOD, AND NON-TRANSITORY COMPUTER-READABLE STORAGE MEDIUM STORING PROGRAM

(71) Applicant: Canon Kabushiki Kaisha, Tokyo (JP)

(72) Inventor: Takashi Sawada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 18/418,437

(22) Filed: Jan. 22, 2024

(65) Prior Publication Data

US 2024/0259503 A1     Aug. 1, 2024

(30) Foreign Application Priority Data

Jan. 31, 2023     (JP) ................................. 2023-013287

(51) Int. Cl.
      H04N 1/00                    (2006.01)
(52) U.S. Cl.
      CPC ..... H04N 1/00037 (2013.01); H04N 1/00087 (2013.01); H04N 1/00244 (2013.01); H04N 1/00344 (2013.01); H04N 1/00411 (2013.01); H04N 2201/0094 (2013.01)

(58) Field of Classification Search
      CPC ........... H04N 1/00037; H04N 1/00087; H04N 1/00244
      See application file for complete search history.

(56) References Cited

U.S. PATENT DOCUMENTS

2011/0202433 A1*   8/2011   Yokoyama ........... G06Q 10/087
                                                                705/28
2021/0122165 A1*   4/2021   Watanabe ............. G06F 3/1287

FOREIGN PATENT DOCUMENTS

JP          2002189959 A       7/2002

* cited by examiner

*Primary Examiner* — Ibrahim Siddo
(74) *Attorney, Agent, or Firm* — Venable LLP

(57)                        ABSTRACT

An image forming apparatus includes: an acquisition unit that acquires information concerning a contract of a subscription service of the image forming apparatus; a storage unit that stores the information concerning the contract of the subscription service acquired by the acquisition unit; and a control unit that sets, based on a fact that the information concerning the contract of the subscription service stored in the storage unit is first information indicating purchase of the image forming apparatus, a state of the image forming apparatus to a state corresponding to the first information.

18 Claims, 10 Drawing Sheets

F I G. 1

1

3

FLAT-RATE SERVICE
SERVER

5

NETWORK

2

IMAGE FORMING
APPARATUS

4

INFORMATION
PROCESSING
APPARATUS

FIG. 3

F I G.  9
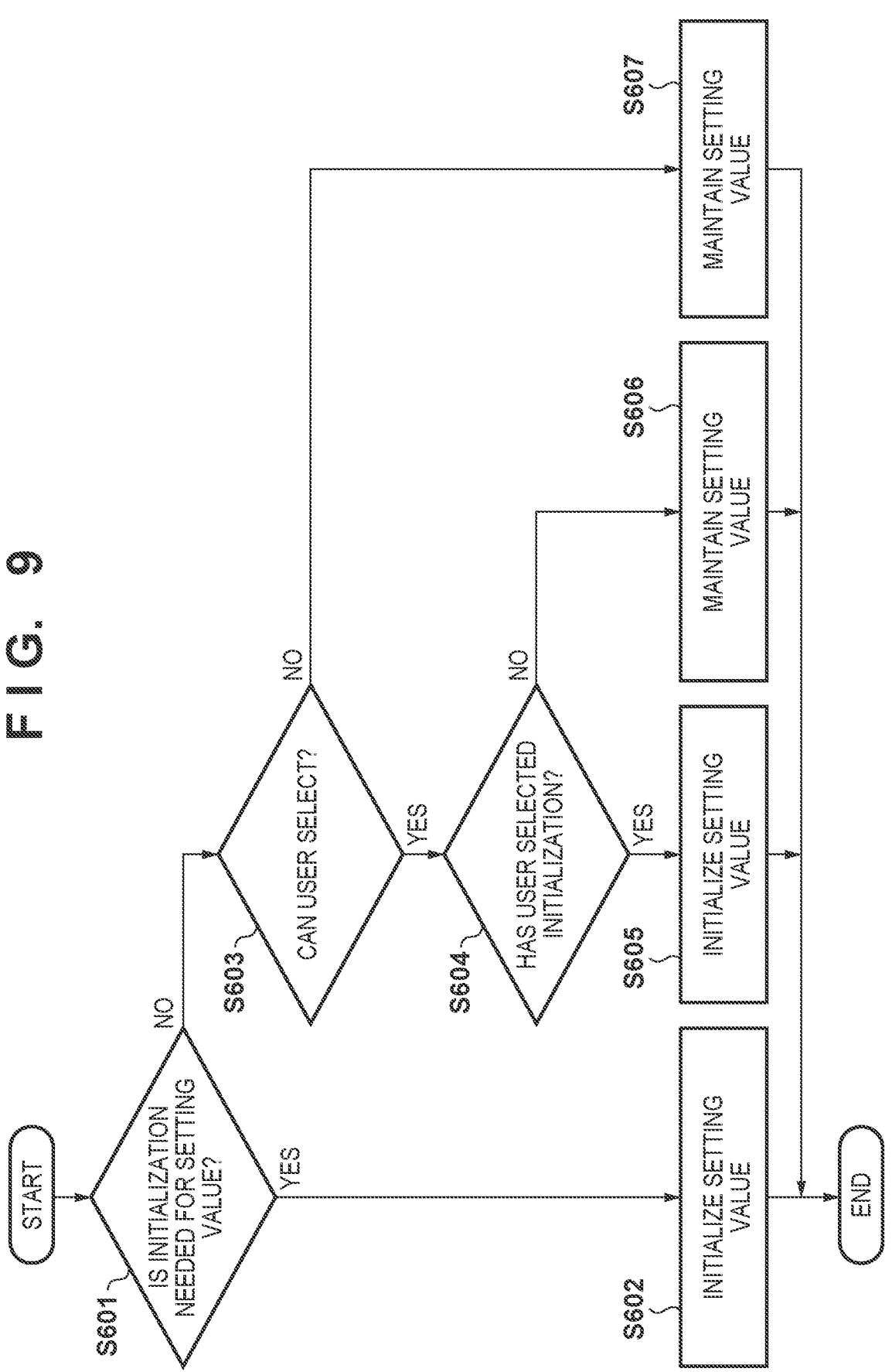

F I G. 10

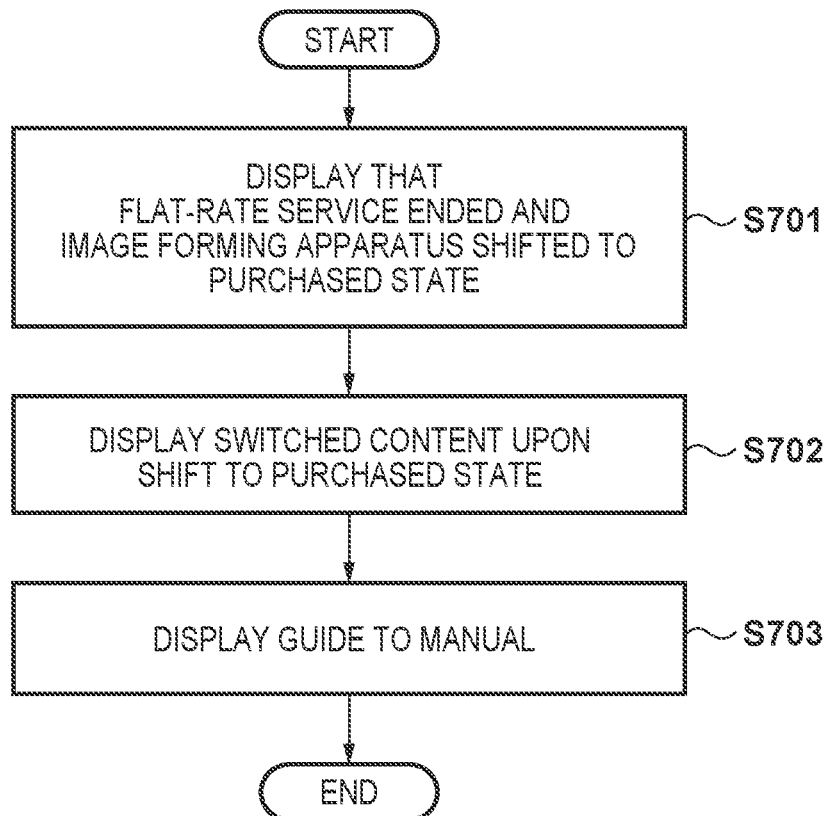

1001

| SETTING VALUE ITEM | PROCESSING WHEN SHIFTING TO PURCHASED STATE |
|---|---|
| IMAGE QUALITY SETTING VALUE | MAINTAIN |
| HARDWARE ADJUSTMENT VALUE | MAINTAIN |
| SYSTEM SETTING VALUE | USER CAN SELECT |
| FLAT-RATE SERVICE SETTING VALUE | INITIALIZATION |
| COUNTER VALUE | MAINTAIN |

1002                                              1003

F I G. 11

START

DISPLAY THAT
FLAT-RATE SERVICE ENDED AND
IMAGE FORMING APPARATUS SHIFTED TO
PURCHASED STATE  ~S701

DISPLAY SWITCHED CONTENT UPON
SHIFT TO PURCHASED STATE  ~S702

DISPLAY GUIDE TO MANUAL  ~S703

END

IMAGE FORMING APPARATUS, CONTROL METHOD, AND NON-TRANSITORY COMPUTER-READABLE STORAGE MEDIUM STORING PROGRAM

BACKGROUND OF THE INVENTION

Field of the Invention

The present invention relates to an image forming apparatus communicable with a server, a control method, and a non-transitory computer-readable storage medium storing a program.

Description of the Related Art

Conventionally, there has been a flat-rate service in which a main body and a consumable used for printing in an image forming apparatus such as an inkjet printer or a copy machine can be used at a flat rate. Since a flat-rate service provider prepares a consumable and a printing apparatus main body necessary for printing, a printing environment is prepared for the user only by making a contract. There is a case where the user purchases the ownership of a printer by canceling a flat-rate service contract due to a change in use environment of the user, and individually, separately purchases a consumable to use it. Japanese Patent Laid-Open No. 2002-189959 describes that in a rental service as a form of a flat-rate service, when purchasing renting merchandise, the purchase price for purchasing the merchandise is decided based on information concerning the renting.

SUMMARY OF THE INVENTION

The present invention provides an image forming apparatus for controlling the state of the image forming apparatus to be a state corresponding to contract information of a service, a control method, and a non-transitory computer-readable storage medium storing a program.

The present invention in one aspect provides an image forming apparatus comprising: at least one memory and at least one processor which function as: an acquisition unit configured to acquire information concerning a contract of a subscription service of the image forming apparatus; a storage unit configured to store the information concerning the contract of the subscription service acquired by the acquisition unit; and a control unit configured to set, based on a fact that the information concerning the contract of the subscription service stored in the storage unit is first information indicating purchase of the image forming apparatus, a state of the image forming apparatus to a state corresponding to the first information.

According to the present invention, it is possible to control the state of an image forming apparatus to be a state corresponding to contract information of a service.

Further features of the present invention will become apparent from the following description of exemplary embodiments with reference to the attached drawings.

BRIEF DESCRIPTION OF THE DRAWINGS

FIG. 1 is a view showing the arrangement of a flat-rate service system;

FIG. 3 is a view showing the outer appearance of the image forming apparatus;

FIG. 9 is a flowchart illustrating the shift processing to the purchased state;

FIG. 10 is a table defining processing of a setting value; and

FIG. 11 is a flowchart illustrating shift processing to the purchased state.

DESCRIPTION OF THE EMBODIMENTS

Figure 2:
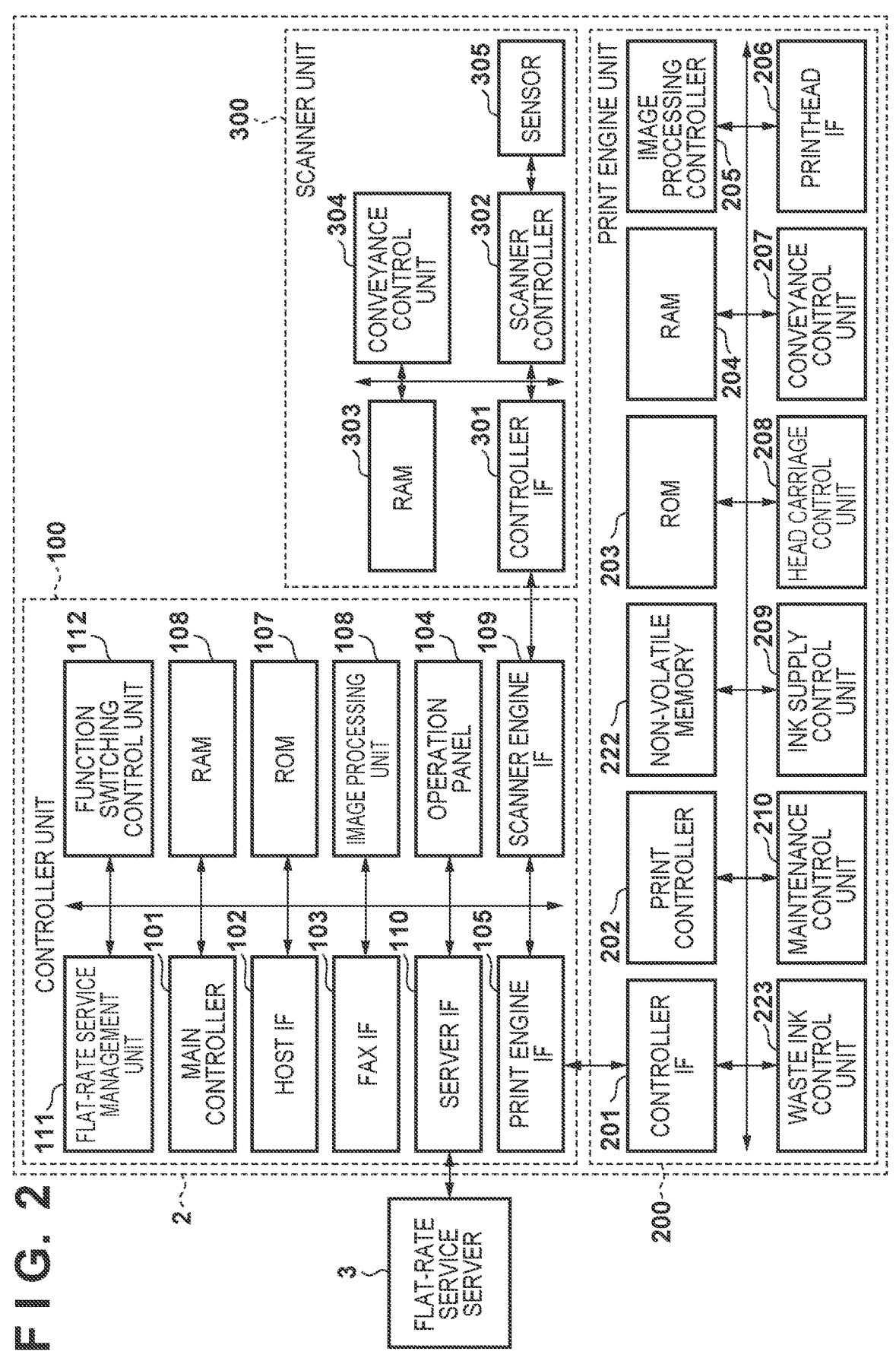
FIG. 2 is a block diagram showing the arrangement of an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

For example, if a state shifts from a flat-rate service contracted state to a purchased state of a printing apparatus, it is required to quickly set the printing apparatus to be usable in a state in which there are no restrictions of functions in a flat rate service.

According to the present disclosure, it is possible to control the state of an image forming apparatus to be a state corresponding to contract information of a service.

Figure 1:
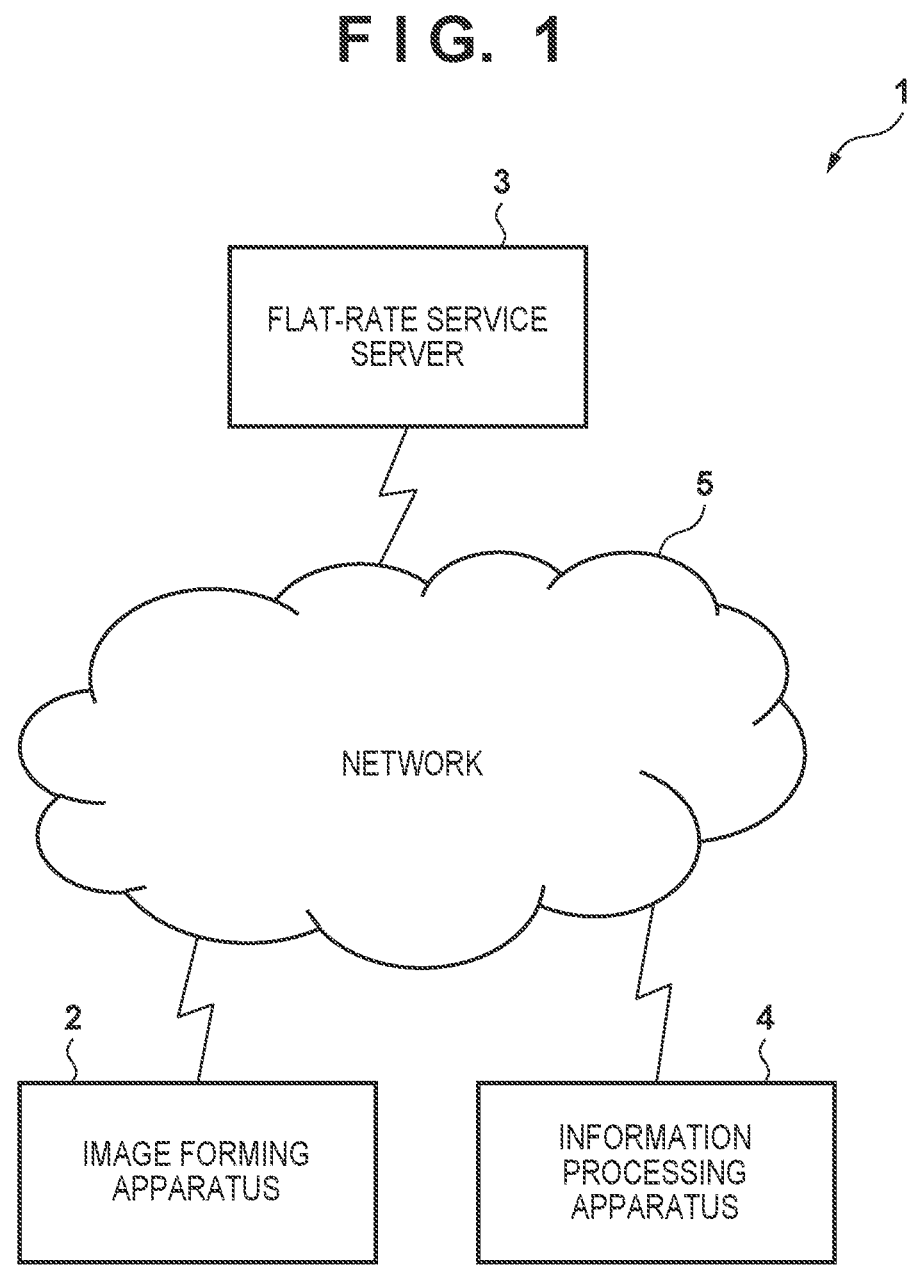

FIG. 1 is a view showing an example of the arrangement of a flat-rate service system 1 according to an embodiment. In the flat-rate service system 1, an image forming apparatus 2, a flat-rate service server 3, and an information processing apparatus 4 are communicably connected via a network 5. In this example, the information processing apparatus 4 is a personal computer (PC), a tablet terminal, a smartphone, or the like. The image forming apparatus 2 is, for example, an apparatus having an image forming function, such as a multi-function peripheral (MFP) having a copy function, a scan function, and a facsimile function, a printer apparatus, a copy apparatus, or a facsimile apparatus. The flat-rate service server 3 is a server that can provide a flat-rate service.

An overview of a flat-rate service as one of charging services provided by the flat-rate service system 1 will be described. The flat-rate service is a subscription service that provides, to the user, a printing environment having the feature that the same amount is charged until a predetermined number of sheets are printed, in accordance with a monthly plan fee. In a case where the predetermined number of sheets is exceeded, it is possible to change the plan to a higher plan or a measured rate system for increasing a charging amount for each sheet is adopted. If the user accesses the flat-rate service server 3 to apply the flat-rate service, a service provider delivers the image forming apparatus 2 including a consumable (consumable material) to the user.

For example, the user accesses the URL of the flat-rate service server 3 on the information processing apparatus 4 such as a smartphone or a PC. The information processing apparatus 4 displays, by a Web browser or a dedicated application, a screen for contracting the flat-rate service. The user inputs, to the screen, information necessary to contract the flat-rate service. The information necessary to contract the flat-rate service includes, for example, user information such as a subscriber name, the type of the service to be contracted, the address of the delivery destination of the consumable, and a fee payment method. The flat-rate service server 3 registers the information input to the screen, and then the service provider delivers the image forming apparatus 2. After the image forming apparatus 2 is delivered to the user, the user performs initial installation (setup) including processing of performing connection to the network 5. In the initial installation, the image forming apparatus 2 is registered in a device management server (not shown) held by the service provider. The flat-rate service server 3 saves "contracted" as the contract state of the flat-rate service in a flat-rate service management unit 111 of the image forming apparatus 2. The contract state includes, for example, "uncontracted", "contracted", and "canceled". For example, in the above case, when the image forming apparatus 2 is delivered, the user has already performed the above-described contract operation, and thus the contract state stored in the flat-rate service management unit 111 of the image forming apparatus 2 is "contracted". On the other hand, in the case of a service for which the user optionally makes a contract, when the image forming apparatus 2 is delivered, the user may not have performed the above contract operation. In this case, the flat-rate service server 3 saves "uncontracted" as the contract state in the flat-rate service management unit 111 of the image forming apparatus 2. After that, if the user performs the above contract operation, the image forming apparatus 2 receives flat-rate service subscription information from the flat-rate service server 3, and changes the contract state saved in the flat-rate service management unit 111 to "contracted". Furthermore, the "canceled" state includes two states. There are a case where the flat-rate service is canceled and the rented image forming apparatus 2 is returned, and a case where the user purchases the rented image forming apparatus 2. This embodiment assumes that the user can select whether to purchase the image forming apparatus 2 at the time of canceling the flat-rate service. Then, if the user selects to purchase the image forming apparatus 2, information indicating the contract state saved in the flat-rate service management unit 111 includes information indicating "purchase" in addition to information indicating "canceled". Alternatively, if the user selects to return the image forming apparatus 2 without purchasing it, information indicating "non-purchase" may be saved in addition to the information indicating "canceled".

If the user executes printing using the image forming apparatus 2 after contracting the flat-rate service, the image forming apparatus 2 creates a job log that describes the number of printed sheets and the amount of the consumed consumable, and transmits the job log to the flat-rate service server 3. Based on the information of the transmitted job log, the flat-rate service server 3 counts the number of print sheets for one month, calculates the consumption rate of the consumable, and delivers the consumable at a timing when the remaining amount of the consumable becomes equal to or smaller than a threshold. If the flat-rate service is contracted, the image forming apparatus 2 periodically transmits the job log to the flat-rate service server 3 via the network 5. Therefore, in order for the user to receive the flat-rate service, the image forming apparatus 2 needs to be connected to the network 5. If the image forming apparatus 2 is not connected to the network 5, the functions of the image forming apparatus 2 are restricted.

The flat-rate service server 3 has the arrangement of a general-purpose information processing apparatus such as a PC, and manages, as a database, the information (corresponding to service contract information) input by the user and the device information (the information of the image forming apparatus) in linkage with each other. The information input by the user includes, for example, the above-described address of the delivery destination of the consumable. Note that the flat-rate service server 3 is not always formed as a single server apparatus, and may be formed from a plurality of server apparatuses held by the service provider. The flat-rate service server 3 may have another server function such as a device management server that manages a device.

FIG. 1 shows an example of the arrangement of the flat-rate service system, and an apparatus not shown in FIG. 1, for example, a router may be included. For example, in a case where the image forming apparatus 2 is installed in the home of the user, the image forming apparatus 2 is connected to the Internet via a router or the like, and can communicate with the flat-rate service server 3 via the network 5. In this case, the information processing apparatus 4 held by the user is, for example, a smartphone or a PC, and may be directly communicable with the image forming apparatus 2 or may be communicable with the image forming apparatus 2 via a router having an access point function. The information processing apparatus 4 is used for, for example, initial installation including processing of connecting, to the network 5, the image forming apparatus 2 delivered from the service provider. After the completion of the initial installation, for example, the information processing apparatus 4 directly transmits image data created by an application to the image forming apparatus 2 or transmits the image data to the image forming apparatus 2 via a cloud server (not shown), thereby executing printing. FIG. 1 shows one image forming apparatus 2 but a plurality of image forming apparatuses 2 may be connected to the network 5. The network 5 is a network including a wired network, a wireless network, or both of them.

Figure 3:
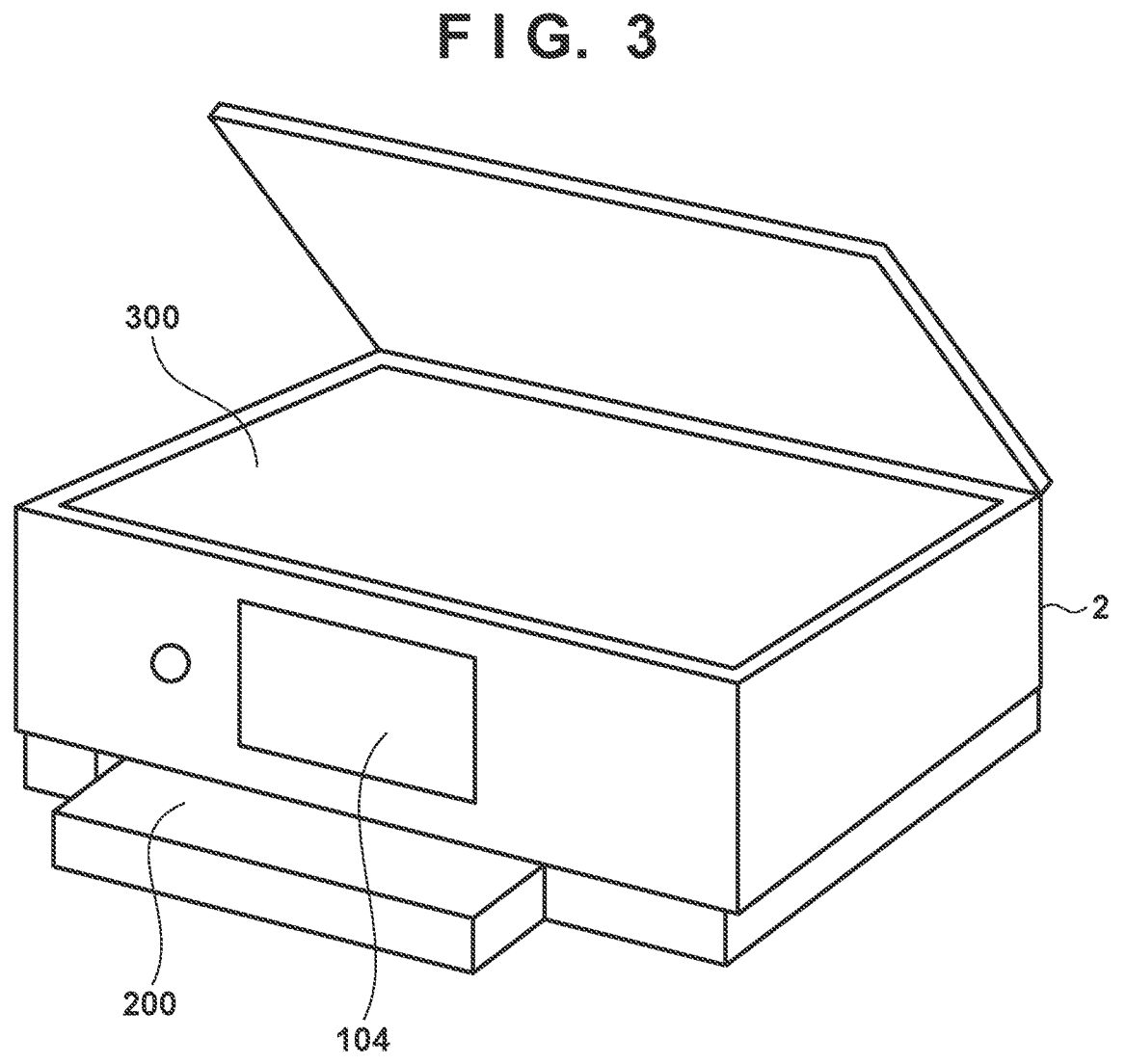

FIG. 2 is a block diagram showing an example of the arrangement of the image forming apparatus 2. FIG. 3 is a view showing the outer appearance of the image forming apparatus 2. In this embodiment, the image forming apparatus 2 will be described as an inkjet printer but may be a printer that forms an image by another printing method. For example, the image forming apparatus 2 may be a laser beam printer. Therefore, ink will be exemplified as an example of the consumable but toner may be used.

The image forming apparatus 2 includes a print engine unit 200 that mainly controls a print unit, a scanner engine unit 300 that controls a scanner unit, and a controller unit 100 that controls the overall image forming apparatus 2. A print controller 202 controls various mechanisms of the print engine unit 200 by instructions of a main controller 101 of the controller unit 100. Various mechanisms of the scanner engine unit 300 are controlled by the main controller 101 of the controller unit 100.

In the controller unit 100, the main controller 101 including a CPU controls the overall image forming apparatus 2 in accordance with a program and various parameters stored in a ROM 107. At this time, a RAM 106 is used as a work area. The operation of the image forming apparatus 2 according to this embodiment is implemented when, for example, the main controller 101 reads out a program stored in the ROM 107 and executes the readout program.

A host I/F 102 controls communication with an external apparatus such as the information processing apparatus 4. A FAX I/F 103 controls FAX communication with the outside. A server I/F 110 controls communication with the flat-rate service server 3. Note that the host I/F 102 and the server I/F 110 need not be separate components and may be one component. The host I/F 102 and the server I/F 110 have an arrangement corresponding to the network 5. The host I/F 102 and the server I/F 110 have, for example, an arrangement corresponding to wired communication or wireless communication. As a communication method used for wireless communication, for example, Wireless Fidelity (Wi-Fi)® or Bluetooth® is applicable. As a communication method used for wired communication, for example, Universal Serial Bus (USB) is applicable.

For example, when a print job is input via the host I/F 102, the main controller 101 instructs an image processing unit 108, and the image processing unit 108 executes predetermined image processing for image data corresponding to the print job. Then, the main controller 101 transmits the image data having undergone the image processing to the print engine unit 200 via the print engine I/F 105. When, for example, a read command is input via the host I/F 102, the main controller 101 transmits the read command to the scanner engine unit 300 via a scanner engine I/F 109.

An operation panel 104 is formed as, for example, a touch panel, and is a mechanism for accepting a user operation. Furthermore, the operation panel 104 can display various user interface screens. The operation panel 104 can accept, for example, an instruction operation of a copy, a scan, or the like, and a setting operation of a print mode or the like.

The flat-rate service management unit 111 receives information indicating the contract state of the flat-rate service of the image forming apparatus 2 from the flat-rate service server 3, and manages the contract state of the flat-rate service of the image forming apparatus 2. Depending on the contract state of the flat-rate service, the scan function and the FAX function may be restricted. The flat-rate service management unit 111 manages correspondence between the contract state of the flat-rate service and the restricted functions. A function switching control unit 112 controls switching of the function of the image forming apparatus 2 based on the contract state of the flat-rate service stored in the flat-rate service management unit 111. For example, the function switching control unit 112 has information of enabling/disabling of each function of the image forming apparatus 2, and the main controller 101 controls enabling/disabling of execution of each function based on the information. In this embodiment, for example, the function of the image forming apparatus 2 is switched by rewriting the information by the function switching control unit 112.

In the print engine unit 200, the print controller 202 including a CPU controls the various mechanisms in accordance with a program and various parameters stored in a ROM 203. At this time, a RAM 204 is used as a work area. Upon receiving various commands and image data via a controller I/F 201, the print controller 202 temporarily stores them in the RAM 204. Then, the print controller 202 instructs an image processing controller 205 to convert the image data stored in the RAM 204 into print data so that a printhead (not shown) can use the data for a print operation. When the print data is generated, the print controller 202 causes the printhead to execute a print operation via a printhead I/F 206. At this time, the print controller 202 controls conveyance of a print medium via a conveyance control unit 207, and controls, via a carriage control unit 208, movement of a carriage mounted with the printhead. An ink supply control unit 209 controls, for example, supply of ink from an ink cartridge to the printhead. By an instruction from the print controller 202, a print operation is executed in synchronism with the conveyance operation of the print medium, thereby performing print processing. A maintenance control unit 210 controls the maintenance operation of the printhead, such as preliminary discharge. A waste ink control unit 223 causes a sensor to detect the amount of waste ink stored in a waste ink tank by preliminary discharge or the maintenance operation of the printhead.

A nonvolatile memory 222 stores various parameters to be used for printing. As the parameters, for example, print setting information indicating N-in-1 print, double-sided or single-sided print, color or monochrome print, and photo or document print is stored. If parameters set by the user are applied, the print controller 202 receives, via the print engine I/F 105, the setting values input to the operation panel 104, and reflects them on print settings.

The main controller 101 can control the hardware resources of a scanner controller 302 via a controller I/F 301 in accordance with a program and various parameters stored in the ROM 107. This controls the various mechanisms of the scanner engine unit 300. For example, by controlling the hardware resources of the scanner controller 302, it is possible to convey, via a conveyance control unit 304, a document placed by the user on an Automatic Document Feeder (ADF), and optically read the document by a sensor 305. The scanner controller 302 stores read image data in a RAM 303. Note that the print controller 202 can cause the printhead to execute a print operation (copy) based on the image data read by the scanner controller 302 by converting the acquired image data into print data, as described above.

Figure 4:
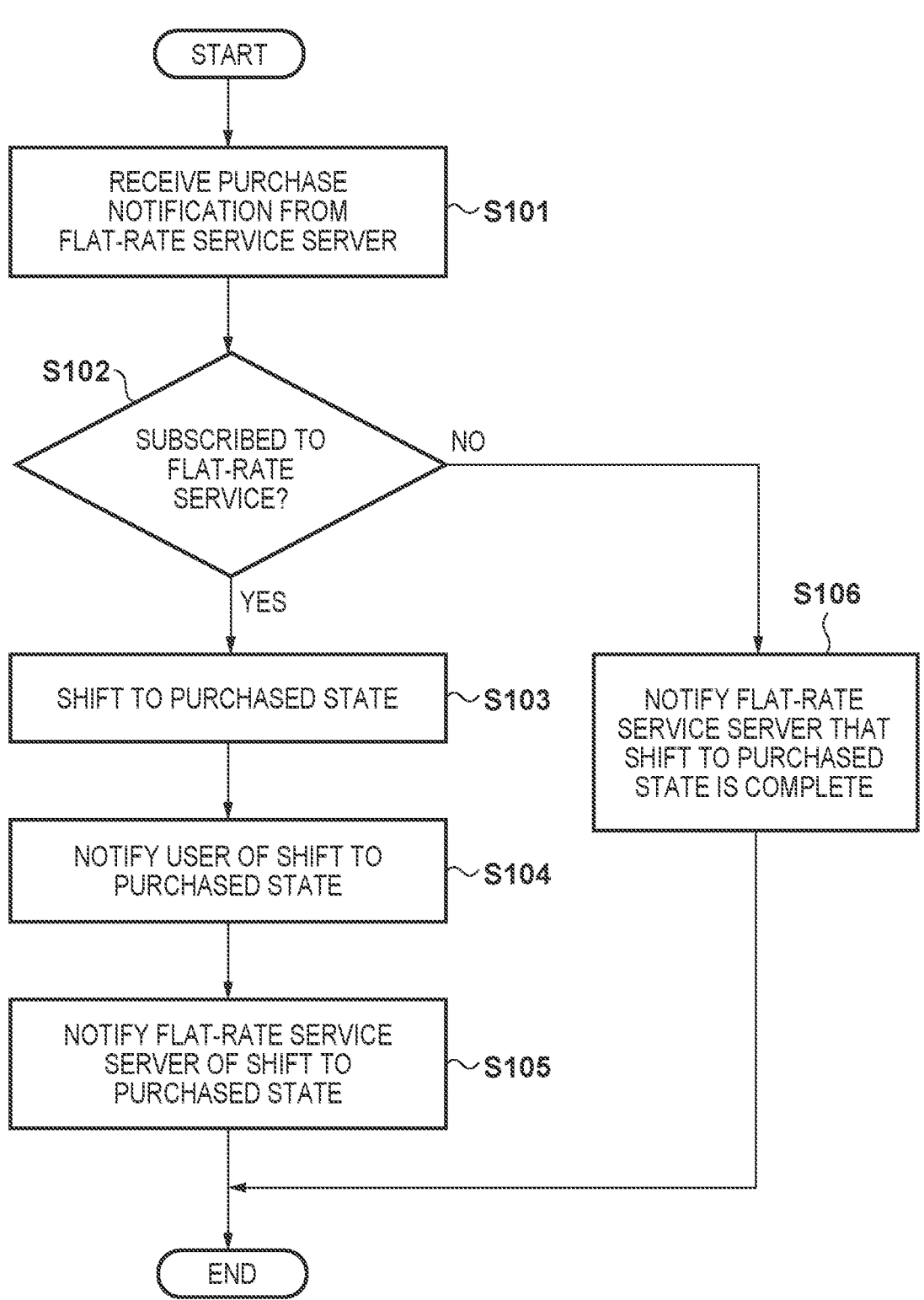
FIG. 4 is a flowchart illustrating shift processing to a purchased state.

Subsequently, processing of shifting the state of the image forming apparatus 2 from the flat-rate service contracted state to the purchased state after purchase in a case where the image forming apparatus 2 receives, from the flat-rate service server 3, a notification indicating cancellation of the flat-rate service and purchase will be described with reference to FIG. 4. The flat-rate service contracted state indicates a state in which among functions executable by the image forming apparatus 2, functions enabled in the flat-rate service are executable (or disabled functions are inexecutable). The purchased state indicates a state in which among the functions executable by the image forming apparatus 2, functions enabled after purchase are executable (or disabled functions are inexecutable). The processing shown in FIG. 4 is implemented when, for example, the main controller 101 reads out a program stored in the ROM 107 into the RAM 106 and executes the readout program.

This embodiment assumes the following use case as an example. When terminating the flat-rate service contract, or changing the flat-rate service contracted state to the purchased state, the user notifies a sales company that he/she purchases the image forming apparatus 2. Then, upon receiving the notification, the sales company changes (updates), on the flat-rate service server 3, the contract information of the image forming apparatus 2 used by the user from information indicating the flat-rate service contracted state to information indicating that the service has been canceled and the image forming apparatus 2 has been purchased. Based on update of the database, the flat-rate service server 3 transmits, to the image forming apparatus 2, a change notification indicating that the state has been changed to the purchased state.

In step S101, the controller unit 100 of the image forming apparatus 2 receives the change notification via the server I/F 110. In step S102, the controller unit 100 refers to the contract state of the flat-rate service currently held in the flat-rate service management unit 111, and determines whether the contract state is "contracted" in which the user subscribes to the flat-rate service. If the flat-rate service contracted state is determined, the process advances to step S103; otherwise, the process advances to step S106.

In step S103, the controller unit 100 executes shift processing of shifting the state of the image forming apparatus 2 to the purchased state. The shift processing to the purchased state will be described later with reference to FIG. 5.

After shifting the image forming apparatus 2 to the purchased state, the controller unit 100 executes, in step S104, notification processing of notifying the user that the image forming apparatus 2 has shifted to the purchased state. The notification processing will be described later with reference to FIG. 11. In step S105, the controller unit 100 notifies the flat-rate service server 3 that the image forming apparatus 2 has shifted to the purchased state. Upon receiving the notification, the flat-rate service server 3 need not manage the consumption of the consumable in the image forming apparatus 2 and the like, and thus eliminates the linkage between the information of the image forming apparatus 2 and the information concerning the flat-rate service. After step S105, the processing shown in FIG. 4 ends.

If the flat-rate service contracted state is not determined in step S102, the controller unit 100 notifies, in step S106, the flat-rate service server 3 that the image forming apparatus 2 has already shifted to the purchased state. After that, the processing shown in FIG. 4 ends.

The processing in step S106 is processing considering a case where the processing in step S105 fails due to a communication failure or the like. That is, if the processing in step S105 fails due to a communication failure or the like, the flat-rate service server 3 does not eliminate the linkage between the information of the image forming apparatus 2 and the information concerning the flat-rate service. In a case where the notification that the image forming apparatus 2 has shifted to the purchased state is not received from the image forming apparatus 2 even if a predetermined time elapses after the flat-rate service server 3 transmits the change notification in step S101, the change notification may be transmitted to the image forming apparatus 2 again. In this arrangement, the processing in step S106 can be executed. Instead of receiving the contract information change notification from the flat-rate service server 3, the image forming apparatus 2 may inquire, of the flat-rate service server 3, the contract state of the flat-rate service at a predetermined time interval.

Figure 5:
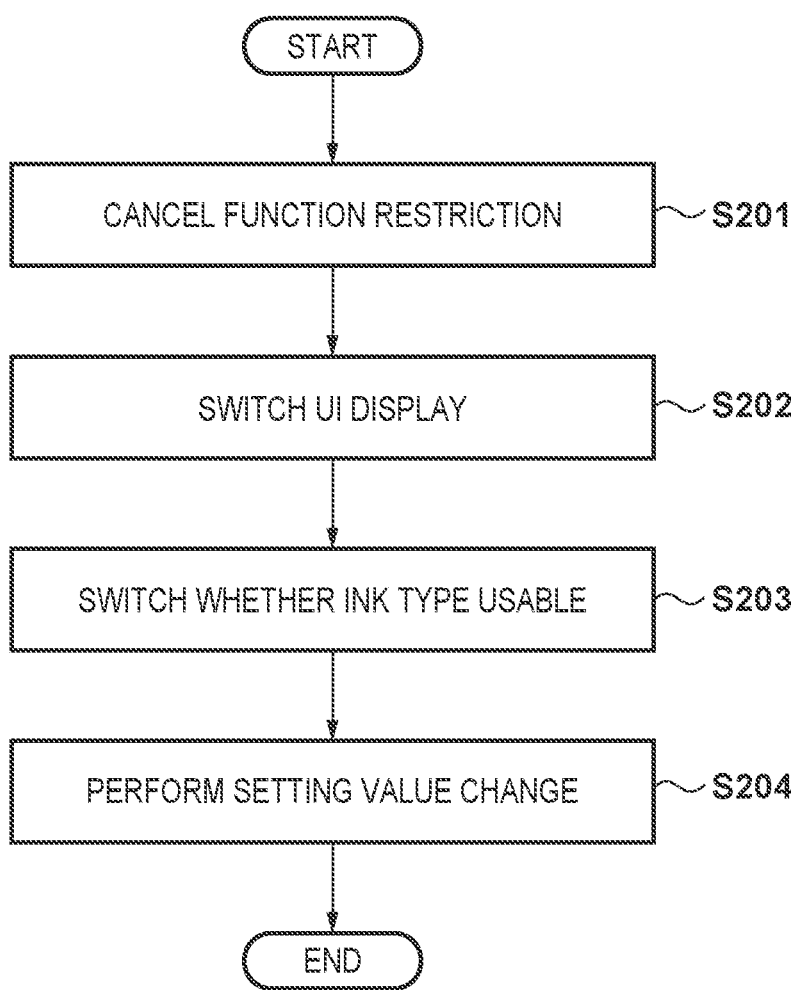
FIG. 5 is a flowchart illustrating the shift processing to the purchased state.

Subsequently, the processing when shifting the image forming apparatus 2 to the purchased state will be described with reference to FIG. 5. FIG. 5 is a flowchart illustrating the processing in step S103.

In step S201, the function switching control unit 112 cancels the function restrictions in the flat-rate service contracted state. The processing of canceling the function restrictions will be described with reference to FIG. 6.

Figure 6:
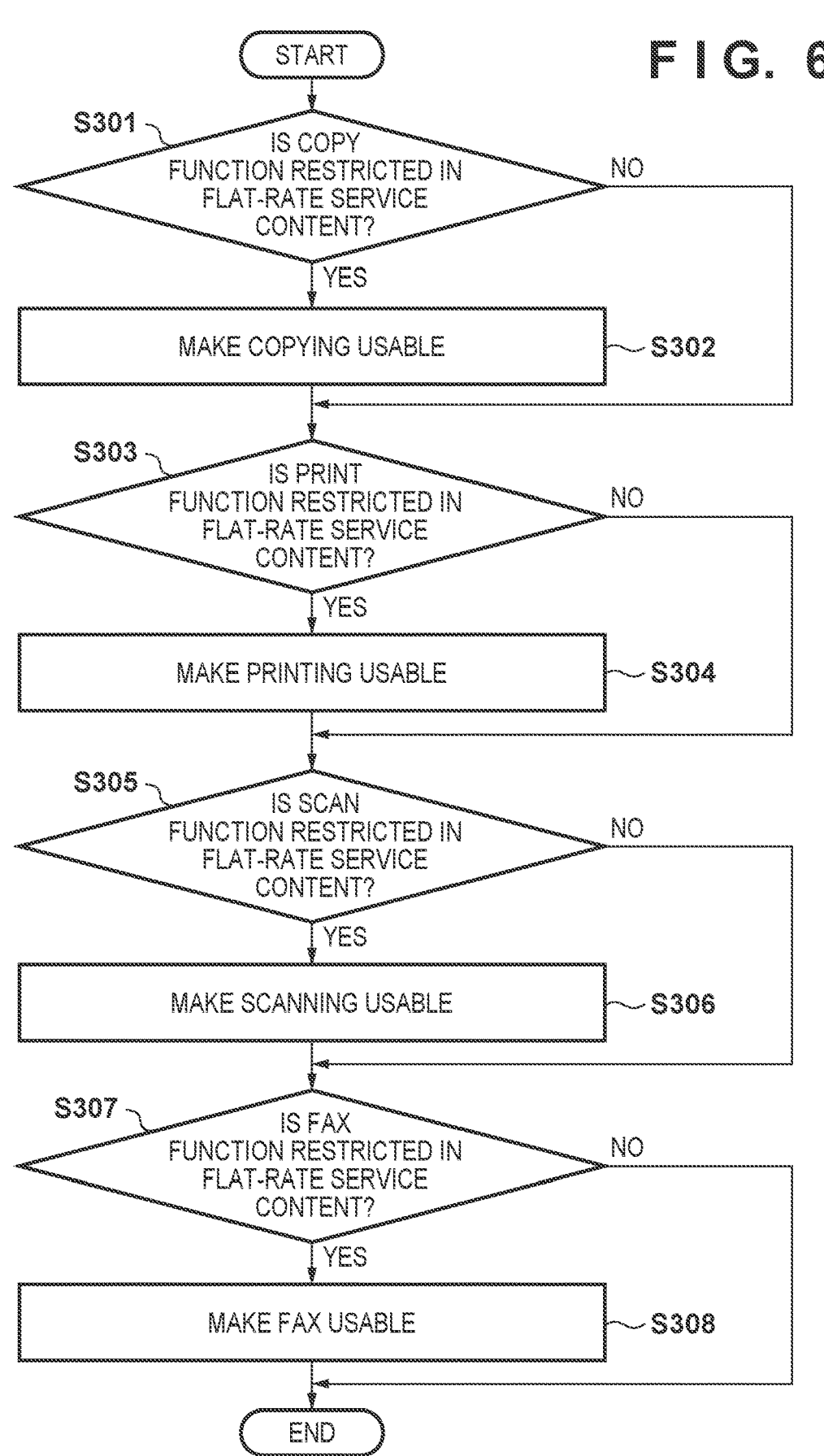
FIG. 6 is a flowchart illustrating the shift processing to the purchased state.

FIG. 6 is a flowchart illustrating the processing in step S201. In step S301, the function switching control unit 112 confirms the information indicating the contract state of the flat-rate service held in the flat-rate service management unit 111, and determines whether the copy function is restricted to be unusable. If it is determined that the copy function is restricted to be unusable, the function switching control unit 112 switches the copy function to be usable in step S302, and the process advances to step S303. For example, the function switching control unit 112 sets the information of enabling/ disabling of the copy function of the image forming apparatus 2 to enabling. On the other hand, if it is determined that the copy function is not restricted to be unusable, the process advances to step S303.

In step S303, the function switching control unit 112 confirms the information indicating the contract state of the flat-rate service held in the flat-rate service management unit 111, and determines whether the print function is restricted to be unusable. If it is determined that the print function is restricted to be unusable, the function switching control unit 112 switches the print function to be usable in step S304, and the process advances to step S305. For example, the function switching control unit 112 sets the information of enabling/ disabling of the print function of the image forming apparatus 2 to enabling. On the other hand, if it is determined that the print function is not restricted to be unusable, the process advances to step S305.

In step S305, the function switching control unit 112 confirms the information indicating the contract state of the flat-rate service held in the flat-rate service management unit 111, and determines whether the scan function is restricted to be unusable. If it is determined that the scan function is restricted to be unusable, the function switching control unit 112 switches the scan function to be usable in step S306, and the process advances to step S307. For example, the function switching control unit 112 sets the information of enabling/ disabling of the scan function of the image forming apparatus 2 to enabling. On the other hand, if it is determined that the scan function is not restricted to be unusable, the process advances to step S307.

In step S307, the function switching control unit 112 confirms the information indicating the contract state of the flat-rate service held in the flat-rate service management unit 111, and determines whether the facsimile function (FAX function) is restricted to be unusable. If it is determined that the FAX function is restricted to be unusable, the function switching control unit 112 switches the FAX function to be usable in step S308, and the processing shown in FIG. 6 ends. For example, the function switching control unit 112 sets the information of enabling/disabling of the FAX function of the image forming apparatus 2 to enabling. On the other hand, if it is determined that the FAX function is not restricted to be unusable, the processing shown in FIG. 6 ends.

Note that the determination processes in steps S301, S303, S305, and S307 are performed in this order in this example but the order is not limited to this. The order of some of the processes may be reversed and the processes may be executed in parallel. Functions as targets of determination of whether to cancel the function restrictions are not limited to the above-described ones and another function may be a determination target. For example, a function unique to the flat-rate service may be restricted. An example of the function unique to the flat-rate service is a function of notifying the flat-rate service server 3 of the number of printed sheets or exhaustion of ink. The function switching control unit 112 may perform switching to restrict such function unique to the flat-rate service.

After the end of the processing shown in FIG. 6, the process advances to step S202 of FIG. 5. In step S202, the function switching control unit 112 switches the user interface (UI) display of the flat-rate service to the UI display of the purchase service.

The UI display corresponding to the flat-rate service is, for example, display of a flat-rate service period, flat-rate plan contents, and the number of printed sheets during the flat-rate service. On the other hand, the UI display corresponding to the purchased state is, for example, display of an ink purchase site. In the purchased state, the user needs to purchase ink when ink is exhausted, and thus the ink purchase site including a URL where the user can purchase ink is displayed. These display data may be managed in the image forming apparatus 2 or may be acquired from an external server. For example, the function switching control unit 112 disables the UI display function for the flat-rate service of the image forming apparatus 2, and enables the UI display function for the purchased state of the image forming apparatus 2. If a user operation is accepted, the main controller 101 switches the UI display displayed on the operation panel 104 based on the setting information of the function switching control unit 112.

Figure 7:
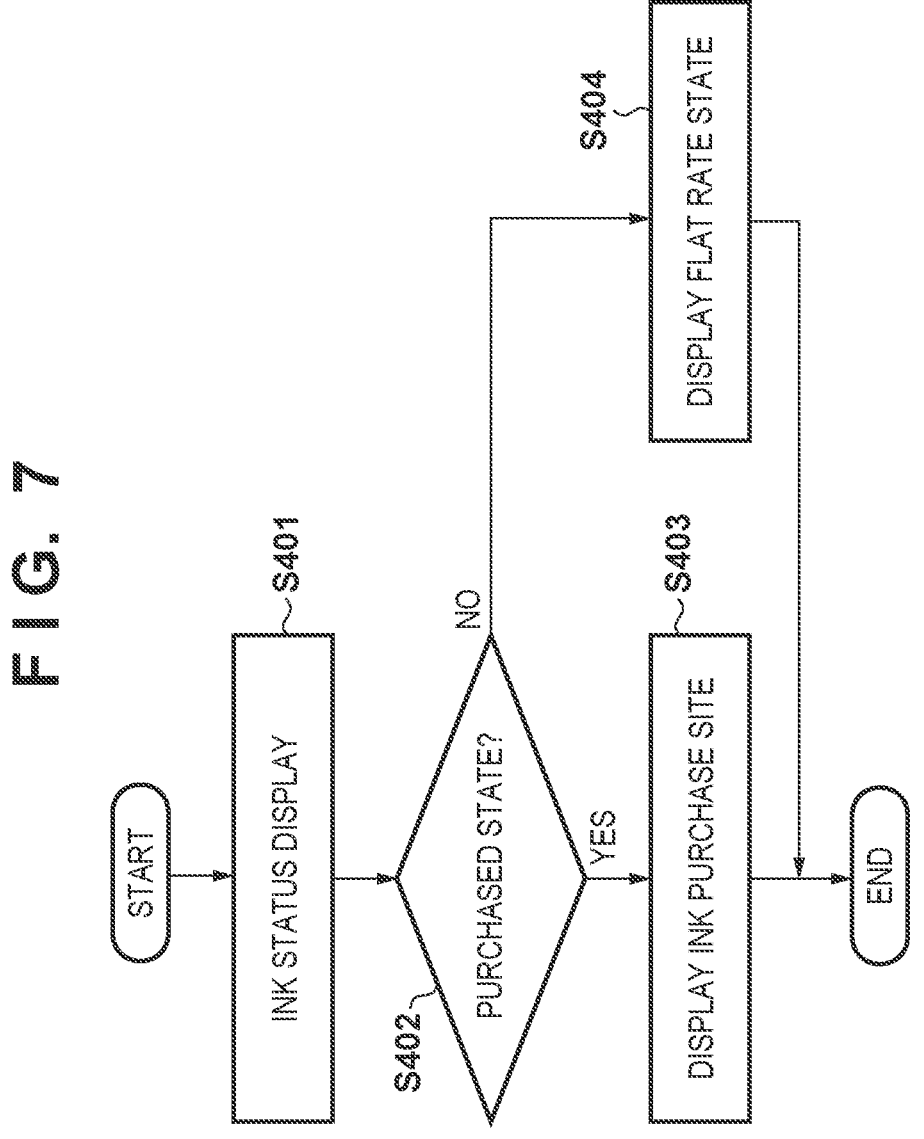
FIG. 7 is a flowchart illustrating the shift processing to the purchased state.

FIG. 7 is a flowchart illustrating the processing of switching the UI display. In step S401, the main controller 101 changes the screen displayed on the operation panel 104. For example, with a user operation on the operation panel 104, the screen transitions to an ink status screen. The ink status screen will be described as an example, but the screen need not be the ink status screen as long as the UI display for the flat-rate service and the UI display for the purchased state are prepared in the screen.

In step S402, before drawing the ink status screen on the operation panel 104 based on the display data, the main controller 101 determines, based on the setting information of the function switching control unit 112, whether the UI display for the purchased state is possible. If it is determined that the UI display for the purchased state is possible, the main controller 101 performs UI display, in step S403, based on the UI display data for the purchased state, as described above. After that, the processing shown in FIG. 7 ends. On the other hand, if it is determined that the UI display for the purchased state is impossible, the UI display for the flat-rate service is determined, and the main controller 101 performs display, in step S404, based on the UI display data for the flat-rate service. After that, the processing shown in FIG. 7 ends.

After step S202 of FIG. 5, the process advances to step S203 of FIG. 5. In step S203, the function switching control unit 112 switches the usable/unusable state of an ink type.

Figure 8:
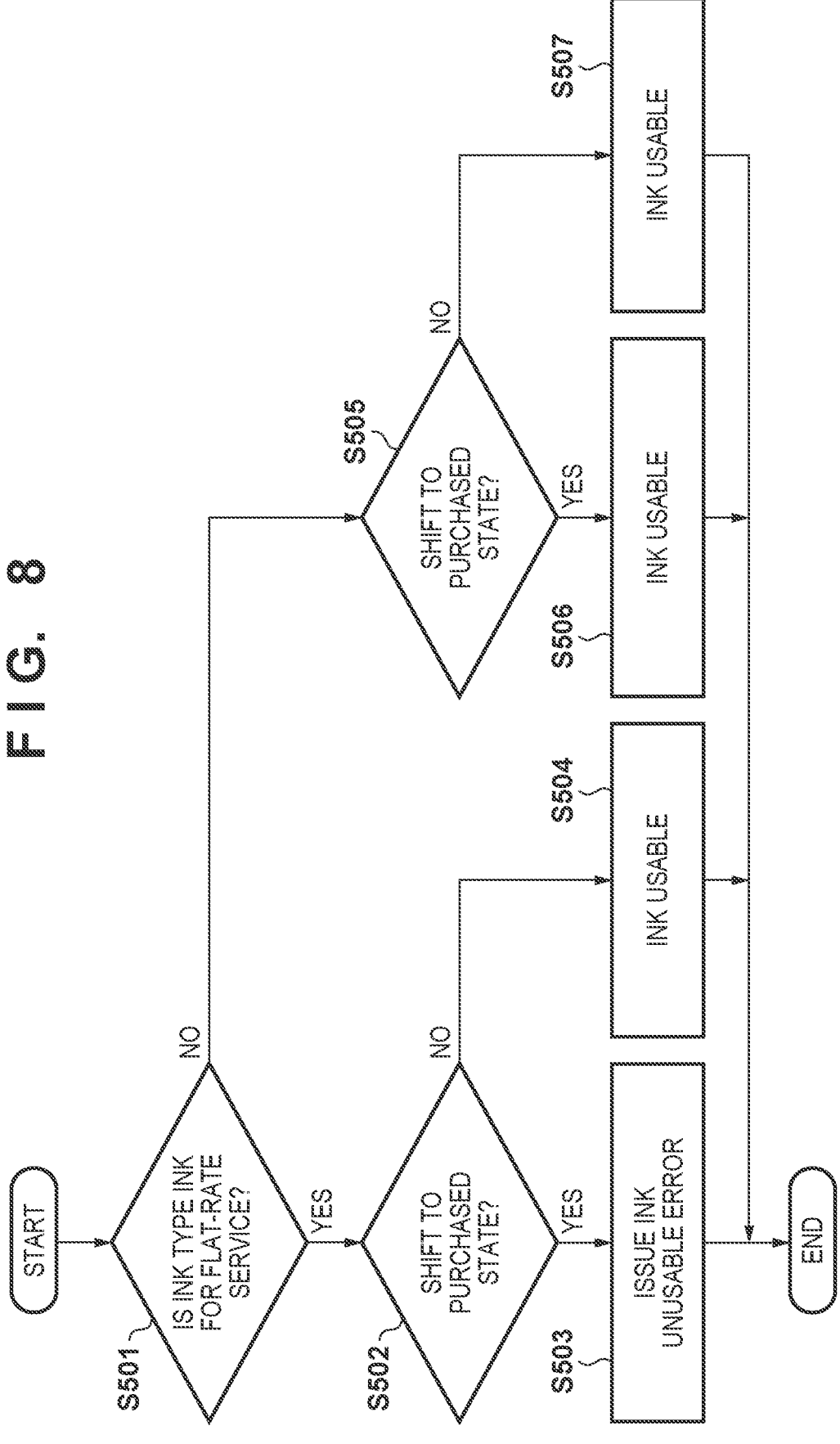
FIG. 8 is a flowchart illustrating the shift processing to the purchased state.

FIG. 8 is a flowchart illustrating the processing in step S203. In step S501, the function switching control unit 112 inquires, of the print controller 202 via the print engine I/F 105 and the controller I/F 201, the type of the ink used in the print engine unit 200, and acquires it. In this embodiment, assume that as the types of inks used in the image forming apparatus 2, there are ink for the flat-rate service that can be used only in the flat-rate service contracted state and normal ink that can be purchased on the ink purchase site. Then, the function switching control unit 112 determines whether the type of the currently used ink is the ink for the flat-rate service. If it is determined that the type of the ink is the ink for the flat-rate service, the process advances to step S502; otherwise, the process advances to step S505. Note that cartridge information of the ink cartridge attached to the print engine unit 200 may include identification information indicating whether the type of the ink is the ink for the flat-rate service, and the determination processing may be performed based on the identification information.

In step S502, the function switching control unit 112 inquires of the flat-rate service management unit 111, and determines whether to shift to the purchased state. If it is determined to shift to the purchased state, the function switching control unit 112 disables use of the ink for the flat-rate service in step S503. For example, the function switching control unit 112 sets the information of enabling/ disabling of ink supply of the image forming apparatus 2 to disabling. Then, the function switching control unit 112 displays, on the operation panel 104, an error screen indicating that ink is unusable. In the error screen, a message for prompting the user to replace the ink with the usable normal ink may be displayed. After that, the processing shown in FIG. 8 ends. On the other hand, if it is determined not to shift to the purchased state, the function switching control unit 112 determines the flat-rate service contracted state and enables use of the ink for the flat-rate service in step S504. For example, the function switching control unit 112 sets the information of enabling/disabling of ink supply of the image forming apparatus 2 to enabling. After that, the processing shown in FIG. 8 ends.

If it is determined in step S501 that the ink is not the ink for the flat-rate service, that is, the normal ink, the function switching control unit 112 inquires of the flat-rate service management unit 111, and determines, in step S505, whether to shift to the purchased state. If it is determined to shift to the purchased state, the function switching control unit 112 enables use of the normal ink in step S506. For example, the function switching control unit 112 sets the information of enabling/disabling of ink supply of the image forming apparatus 2 to enabling. After that, the processing shown in FIG. 8 ends. On the other hand, if it is determined not to shift to the purchased state, the function switching control unit 112 enables use of the normal ink in step S507. For example, the function switching control unit 112 sets the information of enabling/disabling of ink supply of the image forming apparatus 2 to enabling. This example assumes that it is defined to be able to use the normal ink even in the flat-rate service contracted state. However, use of the normal ink may be disabled in step S507 in accordance with the service contents, and an error indicating that the ink is unusable may be displayed on the operation panel 104.

Note that the processing shown in FIG. 8 may be executed at the time of replacing the ink cartridge while the image forming apparatus 2 is used. For example, if the user replaces the ink cartridge of the ink for the flat-rate service in the flat-rate service contracted state, the process advances to steps S501, S502, and S504, and the ink for the flat-rate service is usable. Alternatively, if the user replaces the ink cartridge of the normal ink in the purchased state, the process advances to steps S501, S505, and S506, and the normal ink is usable.

After the end of the processing shown in FIG. 8, the process advances to step S204 of FIG. 5. In step S204, the function switching control unit 112 changes setting values to be used in the processing in the image forming apparatus 2.

The setting values to be used in the processing in the image forming apparatus 2 will now be described. In this embodiment, setting value items are classified into three types by paying attention to a shift of the state of the image forming apparatus 2 from the state corresponding to the flat-rate service to the purchased state. One type is an item that needs to be initialized to an initial value. One type is an item that is initialized based on a user selection of whether to execute initialization. One type is an item for which the setting value in the state corresponding to the flat-rate service is continuously used even in the purchased state.

FIG. 10 shows an example of a table that associates a setting value item with processing when shifting to the purchased state. A table 1001 shown in FIG. 10 is held in, for example, the function switching control unit 112. As setting value items 1002, an image quality setting value, a hardware adjustment value, a system setting value, a flat-rate service setting value, and a counter value are defined. Then, processing 1003 when shifting to the purchased state is associated with each item.

The image quality setting value is a setting value concerning image quality, and includes, for example, initial values of a density adjustment value, ON/OFF of an ink saving mode, and a resolution. Furthermore, the image quality setting value is a setting value used for processing of the image processing unit 108. For example, assume that the user changes the image quality setting value in the flat-rate service contracted state. In this case, even if the state shifts to the purchased state, it is assumed that the same image quality setting value is used. Even if the image forming apparatus 2 initializes the image quality setting value when shifting to the purchased state, it is assumed that the user changes the image quality setting value to a desired value again. That is, the image quality setting value can be a setting value used for processing regardless of the contract state of the service such as the flat-rate service contracted state or the purchased state. Therefore, in this embodiment, when shifting to the purchased state, the image quality setting value is continuously used.

The hardware adjustment value is an adjustment value concerning hardware, and includes, for example, a sheet type set by the user, a periodical cleaning time, and a sheet wrinkle correction value. Furthermore, the hardware adjustment value is a setting value used for processing of the print engine unit 200. For example, assume that the user changes the hardware adjustment value in the flat-rate service contracted state. In this case, even if the state shifts to the purchased state, it is assumed that the same hardware adjustment value is used. Furthermore, even if the image forming apparatus 2 initializes the hardware adjustment value when shifting to the purchased state, it is assumed that the user changes the hardware adjustment value to a desired value again. That is, the hardware adjustment value can be an adjustment value used for processing regardless of the contract state of the service such as the flat-rate service contracted state or the purchased state. Therefore, in this embodiment, when shifting to the purchased state, the hardware adjustment value is continuously used.

The system setting value is a setting value concerning the system, and includes, for example, a network setting value and a security setting value. Furthermore, the system setting value is a setting value used for processing of the main controller 101. For example, assume that the user changes the system setting value in the flat-rate service contracted state. In this case, even if the state shifts to the purchased state, it is assumed that the same system setting value is used. Even if the image forming apparatus 2 initializes the system setting value when shifting to the purchased state, it is assumed that the user changes the system setting value to a desired value again. However, it is assumed that values instructed in the flat-rate service are used with respect to some system setting values, for example, the network setting value and the security setting value. Therefore, in this embodiment, when shifting to the purchased state, each system setting value is initialized based on a user selection.

The flat-rate service setting value is a setting value used only in the flat-rate service contracted state, and includes, for example, the number of print sheets used in the flat-rate service, flat-rate service plan contents, and a flat-rate service period. Furthermore, the flat-rate service setting value is a setting value used for processing of the flat-rate service management unit 111. Therefore, in this embodiment, when shifting to the purchased state, the flat-rate service setting value is initialized.

The counter value is a counter value used to execute each function of the image forming apparatus 2, and includes, for example, the number of times of execution of a job, the number of print sheets for each sheet, and a scan count. The user is unconscious of the counter value. Therefore, in this embodiment, when shifting to the purchased state, the counter value is continuously used. Note that the setting value items are not limited to those shown in FIG. 10, and another setting value item may be associated with processing when shifting to the purchased state.

FIG. 9 is a flowchart illustrating the processing in step S204. In step S601, the function switching control unit 112 determines whether the setting value item of the image forming apparatus 2 is an item that needs to be initialized when shifting to the purchased state. If it is determined that the setting value item is an item that needs to be initialized, the function switching control unit 112 sets, in step S602, the setting value to the initial value. After that, the processing shown in FIG. 9 ends. On the other hand, if it is determined that the setting value item is not an item that needs to be initialized, the process advances to step S603.

In step S603, the function switching control unit 112 determines whether the setting value item is an item for which the user can select whether to initialize the item. If it is determined that the setting value item is an item for which the user can make a selection, the process advances to step S604; otherwise, the function switching control unit 112 does not change the setting value in step S607. That is, the setting value is continuously used in the purchased state. After that, the processes shown in FIGS. 9 and 5 end.

In step S604, the function switching control unit 112 displays, on the operation panel 104, a screen for accepting a user selection of whether to initialize the setting value. Then, the function switching control unit 112 determines whether the selection of initialization of the setting value is accepted from the user. If it is determined that the selection of initialization is accepted, the function switching control unit 112 sets, in step S605, the setting value to the initial value. After that, the processing shown in FIG. 9 ends. On the other hand, if it is determined that the selection of initialization is not accepted, the function switching control unit 112 does not change the setting value in step S606. That is, the setting value is continuously used in the purchased state. After that, the processes shown in FIGS. 9 and 5 end.

After the end of the processes shown in FIGS. 9 and 5, the process advances to step S104 of FIG. 4. In step S104, the controller unit 100 executes processing of notifying the user that the image forming apparatus 2 has shifted to the purchased state.

FIG. 11 is a flowchart illustrating the processing in step S104. In step S701, the flat-rate service management unit 111 displays, on the operation panel 104, a message for allowing the user to recognize that the image forming apparatus 2 has shifted to the purchased state. For example, a message "Thank you for purchasing the printer. The subscription service is no longer available." is displayed on the operation panel 104.

In step S702, the flat-rate service management unit 111 acquires information switched by the function switching control unit 112, and displays the information on the operation panel 104. In step S703, the flat-rate service management unit 111 acquires the function whose function restriction has been canceled by the function switching control unit 112 in the processing shown in FIG. 6. Since the function whose function restriction has been canceled is a function that was not used by the user in the flat-rate service contracted state, the URL of an online manual corresponding to the function is displayed on the operation panel 104. This can lead the user to the online manual. However, since the user may not use the function whose restriction has been canceled, the image forming apparatus 2 can be set, in step S703, to a state in which it can be used by the user. After that, the processing shown in FIG. 11 ends. After the end of the processing shown in FIG. 11, the above-described processing in step S105 is executed to complete the shift to the purchased state.

As described above, according to this embodiment, when changing from the flat-rate service contracted state to the purchased state, the state of the image forming apparatus 2 is shifted to the state corresponding to the purchase service based on the notification from the flat-rate service server 3. For example, this allows the user to use the held image forming apparatus 2 in the state in which the function restrictions in the flat-rate service are canceled.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-013287, filed Jan. 31, 2023, which is hereby incorporated by reference herein in its entirety.

What is claimed is:

1. An image forming apparatus comprising:
at least one memory and at least one processor which function as:
an acquisition unit configured to acquire notification information indicating that a contract of a subscription service of the image forming apparatus is changed to a purchased state of the image forming apparatus;

a storage unit configured to store information concerning a contract of the image forming apparatus; and
a control unit configured to shift, based on a fact that the notification information is acquired by the acquisition unit in a state that the information concerning the contract of the image forming apparatus stored in the storage unit indicates a subscription service contracted state of the image forming apparatus, a state of the image forming apparatus to the purchased state indicated by the notification information.

2. The apparatus according to claim 1, wherein the control unit shifts the state of the image forming apparatus to the purchased state indication by the notification information by setting a function, that is restricted in the subscription service, to be executable.

3. The apparatus according to claim 2, wherein the function that is restricted in the subscription service includes at least one of a copy function, a print function, a scan function, and a facsimile function.

4. The apparatus according to claim 1, further comprising a display unit configured to display a user interface screen,
wherein the control unit shifts the state of the image forming apparatus to the purchased state indicated by the notification information by switching the user interface screen from a user interface screen corresponding to the subscription service contracted state of the image forming apparatus to a user interface screen corresponding to the purchased state indicated by the notification information.

5. The apparatus according to claim 4, wherein the user interface screen corresponding to the subscription service contracted state of the image forming apparatus includes no information concerning purchase of a consumable used in the image forming apparatus, and the user interface screen corresponding to the purchased state indicated by the notification information includes the information concerning the purchase of the consumable.

6. The apparatus according to claim 1, further comprising an image forming unit configured to form an image using a consumable,
wherein the control unit shifts the state of the image forming apparatus to the purchased state indicated by the notification information by controlling use of the consumable in the image forming unit.

7. The apparatus according to claim 6, wherein a consumable corresponding to the subscription service contracted state of the image forming apparatus cannot be used in the image forming unit in the purchased state indicated by the notification information.

8. The apparatus according to claim 1, wherein the control unit shifts the state of the image forming apparatus to the purchased state indicated by the notification information by executing predetermined processing for a setting value used in the image forming apparatus.

9. The apparatus according to claim 8, wherein the predetermined processing is initialization.

10. The apparatus according to claim 9, wherein the setting value as a target of the predetermined processing is used in the subscription service contracted state of the image forming apparatus, and is not used in the purchased state indicated by the notification information.

11. The apparatus according to claim 9, wherein the predetermined processing is initialization based on an instruction from a user.

12. The apparatus according to claim 1, further comprising a notification unit configured to make a notification of a shift to the purchased state indicated by the notification information.

13. The apparatus according to claim 12, wherein the notification by the notification unit is display by a display unit of the image forming apparatus.

14. The apparatus according to claim 12, wherein the notification unit makes a notification of information concerning a function that is unusable in the subscription service and is usable in a case where the image forming apparatus is purchased.

15. The apparatus according to claim 12, wherein the notification by the notification unit is a notification to a server configured to manage a service.

16. The apparatus according to claim 1, wherein the acquisition unit acquires the notification information from a server configured to manage a service.

17. A control method executed by an image forming apparatus, comprising:

acquiring notification information indicating that a contract of a subscription service of the image forming apparatus is changed to a purchased state of the image forming apparatus;

storing, in a storage unit, information concerning a contract of the image forming apparatus; and shifting, based on a fact that the notification information is acquired in the acquiring in a state that the information concerning the contract of the image forming apparatus stored in the storage unit indicates a subscription service contracted state of the image forming apparatus, a state of the image forming apparatus to the purchased state indicated by the notification information.

18. A non-transitory computer-readable storage medium storing a program configured to cause a computer to function to:

acquire notification information indicating that a contract of a subscription service of an image forming apparatus is changed to a purchased state of the image forming apparatus;

store, in a storage unit, information concerning a contract of the image forming apparatus; and shift, based on a fact that the notification information is acquired in a state that the information concerning the contract of the image forming apparatus stored in the storage unit indicates a subscription service contracted state of the image forming apparatus, a state of the image forming apparatus to the purchased state indicated by the notification information.

* * * * *